United States Patent
Uchiyama (10) Patent No.: US 11,933,404 B2
(45) Date of Patent: Mar. 19, 2024

(54) SEALING DEVICE

(71) Applicant: NOK CORPORATION, Tokyo (JP)

(72) Inventor: Masasuke Uchiyama, Shizuoka (JP)

(73) Assignee: NOK CORPORATION, Tokyo (JP)

( * ) Notice: Subject to any disclaimer, the term of this patent is extended or adjusted under 35 U.S.C. 154(b) by 53 days.

(21) Appl. No.: 17/614,791

(22) PCT Filed: Jun. 5, 2020

(86) PCT No.: PCT/JP2020/022358
§ 371 (c)(1),
(2) Date: Nov. 29, 2021

(87) PCT Pub. No.: WO2021/014798
PCT Pub. Date: Jan. 28, 2021

(65) Prior Publication Data
US 2022/0221058 A1 Jul. 14, 2022

(30) Foreign Application Priority Data
Jul. 24, 2019 (JP) .................. 2019-135833

(51) Int. Cl.
*F16J 15/3204* (2016.01)
(52) U.S. Cl.
CPC ............... *F16J 15/3204* (2013.01)
(58) Field of Classification Search
CPC .... F16J 15/00; F16J 15/02; F16J 15/16; F16J 15/50; F16J 15/52; F16J 15/32;
(Continued)

(56) References Cited

U.S. PATENT DOCUMENTS

RE33,715 E   10/1991 Miura
5,078,429 A   1/1992 Braut et al.
(Continued)

FOREIGN PATENT DOCUMENTS

CN   1105430    7/1995
CN   1350132    5/2002
(Continued)

OTHER PUBLICATIONS

China Office Action issued in CN application No. 202080038981.2, dated Mar. 1, 2022.
(Continued)

*Primary Examiner* — Nathan Cumar
(74) *Attorney, Agent, or Firm* — GREENBLUM & BERNSTEIN, P.L.C.

(57) ABSTRACT

A sealing device includes a reinforcing ring formed annularly around an axis and an elastic body part that is formed from an elastic body attached to the reinforcing ring and that is formed annularly around the axis. The reinforcing ring includes a tubular portion having a cylindrical shape around the axis and a flange projecting annularly from an outer end portion of the tubular portion to an inner periphery side. The elastic body part includes a lip portion that is an annular portion covering the flange from an outer side, projecting from the flange toward the outer side in a direction of the axis, and projecting toward the inner periphery side in a radial direction. The lip portion includes a seal lip portion that is an annular portion projecting toward the outer side in the direction of the axis and a secondary lip portion that is an annular portion projecting toward an inner side in the direction of the axis.

7 Claims, 7 Drawing Sheets

(58) Field of Classification Search
CPC .. F16J 15/3204; F16J 15/3208; F16J 15/3212; F16J 15/3216; F16J 15/322; F16J 15/3232; F16J 15/3236; F16J 15/3248; F16J 15/3252; F16J 15/3256
USPC .......................................................... 277/549
See application file for complete search history.

(56) References Cited

U.S. PATENT DOCUMENTS

| | | | |
|---|---|---|---|
| 5,106,127 A | | 4/1992 | Briet |
| 5,409,337 A | * | 4/1995 | Muyskens .............. F16J 15/062 |
| | | | 285/379 |
| 2002/0047242 A1 | | 4/2002 | Watanabe et al. |
| 2004/0169337 A1 | | 9/2004 | Watanabe et al. |
| 2005/0110219 A1 | | 5/2005 | Tsuboi et al. |
| 2007/0170656 A1 | | 7/2007 | Schleker et al. |
| 2008/0221839 A1 | | 9/2008 | Pasino |
| 2008/0290609 A1 | | 11/2008 | Seibert et al. |
| 2009/0309314 A1 | | 12/2009 | Erl et al. |
| 2012/0299249 A1 | | 11/2012 | Okamura et al. |
| 2017/0089465 A1 | | 3/2017 | Yanagi |
| 2018/0017194 A1 | * | 1/2018 | Grouillet .............. F16J 15/3212 |
| 2018/0363802 A1 | | 12/2018 | Oyama et al. |
| 2019/0032783 A1 | * | 1/2019 | Yanagi ..................... F16J 15/12 |
| 2019/0120295 A1 | | 4/2019 | Saza |
| 2019/0203837 A1 | | 7/2019 | Cann et al. |
| 2020/0191273 A1 | * | 6/2020 | Yanagi ................... F16J 15/061 |

FOREIGN PATENT DOCUMENTS

| | | |
|---|---|---|
| CN | 1619195 | 5/2005 |
| CN | 1910391 | 2/2007 |
| CN | 101008449 | 8/2007 |
| CN | 101418861 | 4/2009 |
| CN | 101660582 | 3/2010 |
| CN | 102797852 | 11/2012 |
| CN | 107002879 | 8/2017 |
| CN | 107893852 | 4/2018 |
| CN | 108603597 | 9/2018 |
| CN | 109072980 | 12/2018 |
| CN | 208204003 | 12/2018 |
| CN | 109716006 | 5/2019 |
| FR | 2 656 404 | 6/1991 |
| JP | H6-32834 U | 4/1994 |
| JP | 2001-349434 | 12/2001 |
| JP | 2016-223559 | 12/2016 |
| JP | 2019-49342 A | 3/2019 |
| JP | 2019-74142 A | 5/2019 |
| WO | WO 2015/137491 A1 | 9/2015 |
| WO | 2017/099045 | 6/2017 |
| WO | WO 2018/193766 A1 | 10/2018 |

OTHER PUBLICATIONS

Japan Notice of Reasons for Refusal issued in JP application No. 2021-534590, dated Mar. 28, 2022.
ISR of PCT/JP2020/022358, dated Jul. 14, 2020 (w/ translation).
Japan Office Action received in JP Application No. 2021-534590, dated Jan. 17, 2022.
International Preliminary Report on Patentability received in PCT/JP2020/022358, dated Jan. 25, 2022.
Written Opinion of the International Searching Authority received in PCT/JP2020/022358, dated Jun. 24, 2020.
Extended European Search Report issued in Application No. 20844159.2, dated Jun. 22, 2023.

* cited by examiner

SEALING DEVICE

CROSS REFERENCE TO RELATED APPLICATIONS

This is the National Stage of International Application No. PCT/JP2020/022358, filed Jun. 5, 2020, which claims the benefit of Japanese Patent Application No. 2019-135833, filed Jul. 24, 2019, the disclosures of which are hereby expressly incorporated by reference in their entireties.

TECHNICAL FIELD

The present disclosure relates to a sealing device.

BACKGROUND ART

Conventionally, it is known that a gasket acts as a sealing device that is attached to an annular space like an annular groove formed between a plurality of members, such as a housing and a cover, placed face-to-face and immobilized relative to each other, to seal the annular space. Such a gasket and a plurality of members forming an annular space to which the gasket is attached make up a sealing structure. The gasket as described above including a tubular reinforcing ring formed annularly around an axis and extending in a direction of the axis and an elastic body part formed from an elastic body that is attached to the reinforcing ring is disclosed. In the gasket, the elastic body part includes a pair of lip portions each extending along the axis from both end portions of the reinforcing ring in the direction of the axis (for example, see Patent Literature 1).

In recent years, in response to reductions in size or weight of a component to which the gasket is applied, a cross section of the gasket has been made smaller due to downsizing of the gasket and the component to which the gasket is applied has been developed to be made thinner or to be made of resin. The smaller cross section of the gasket and the development of the component to which the gasket is applied being made thinner or being made of resin decrease a size of the annular space to which the gasket is attached and increase a degree of relative variation in the size of the space caused by manufacturing. As a result, it is conceivable that a gasket cannot provide intended sealing performance because of the variation in the size of the annular space to which the gasket is attached and thus techniques have been disclosed to resolve such a problem (for example, see Patent Literature 2).

DOCUMENT LIST

Patent Literatures

Patent Literature 1: Japanese Utility Model Laid-Open No. 6-32834
Patent Literature 2: International Publication No. WO 2015/137491

SUMMARY OF DISCLOSURE

Technical Problem

If the component to which the gasket is applied is a pipe that constitutes, for example, a hydraulic passage, the gasket receives pressure (internal pressure) from the hydraulic passage on an inner periphery side of the gasket. Thus, in general, the gasket for the pipe of the hydraulic passage is held in an annular groove formed in an inner periphery side of the pipe, as disclosed in the technique of Patent Literature 1, to prevent the gasket from being displaced by the internal pressure in a radial direction perpendicular to the direction of the axis.

Unfortunately, the conventional gasket as disclosed in Patent Literature 1 necessitates forming a groove in the inner periphery side of the pipe. Hence, the conventional gasket cannot be applied to a pipe that is, for example, thin in thickness and makes it difficult to form a groove.

In view of the problems described above, it is an object of the present invention disclosure to provide a sealing device that can possess improved attachability to a component to which the sealing device is applied.

Solution to Problem

A sealing device according to the present invention disclosure, accomplished to attain the object described above, is for sealing an annular space formed by a plurality of members, the sealing device including: a reinforcing ring formed annularly around an axis; and an elastic body part that is formed from an elastic body attached to the reinforcing ring and that is formed annularly around the axis, the reinforcing ring including: a tubular portion having a cylindrical shape around the axis; and a flange projecting annularly from an outer end portion of the tubular portion to an inner periphery side, wherein the elastic body part includes a lip portion that is an annular portion covering the flange from an outer side, projecting from the flange toward the outer side in a direction of the axis, and projecting toward the inner periphery side in a radial direction, the lip portion including: a seal lip portion that is an annular portion projecting toward the outer side in the direction of the axis; and a secondary lip portion that is an annular portion projecting toward an inner side in the direction of the axis.

In the sealing device according to one aspect of the present disclosure, the tubular portion has a tubular-portion inner peripheral surface on the inner periphery side, the flange has a flange inner side surface on the inner side, the tubular-portion inner peripheral surface enables the sealing device to be positioned relative to the plurality of members in the radial direction, and the flange inner side surface enables the sealing device to be positioned relative to the plurality of members in the direction of the axis.

In the sealing device according to one aspect of the present disclosure, the elastic body part includes an inner peripheral portion covering the tubular-portion inner peripheral surface from the inner periphery side.

In the sealing device according to one aspect of the present disclosure, the plurality of members include at least a cylindrical member, the tubular-portion inner peripheral surface enables the sealing device to be positioned in the radial direction by allowing the sealing device to be in contact with an outer peripheral portion included in the cylindrical member, and the flange inner side surface enables the sealing device to be positioned in the direction of the axis by allowing the sealing device to be in contact with an outer side surface formed on the cylindrical member.

In the sealing device according to one aspect of the present disclosure, the seal lip portion projects to the outer side with respect to the flange in the direction of the axis, and the secondary lip portion projects to the inner side with respect to the flange in the direction of the axis.

In the sealing device according to one aspect of the present disclosure, a length of the seal lip portion in the direction of the axis is greater than a length of the secondary lip portion in the direction of the axis.

Effects of Disclosure

The sealing device according to the present disclosure can possess improved attachability to a component to which the sealing device is applied.

DESCRIPTION OF EMBODIMENTS

Hereinafter, embodiments of the present disclosure will be described with reference to the drawings.

First Embodiment

Figure 1:
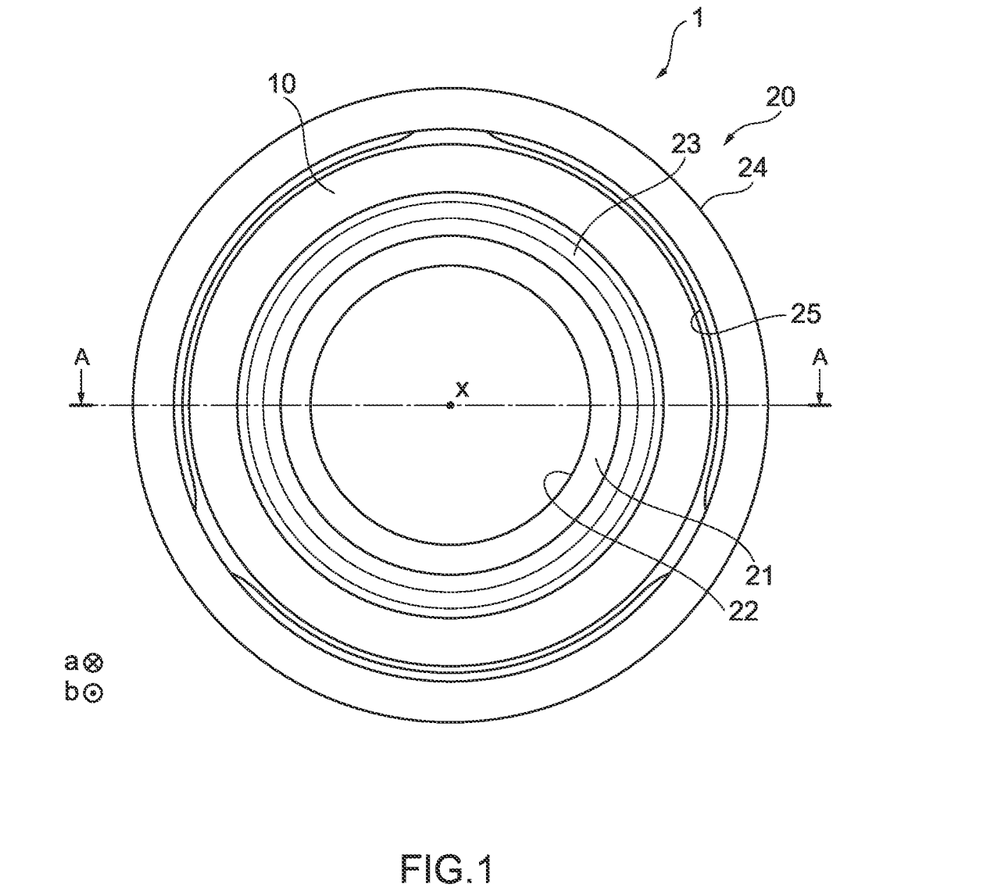
FIG. 1 A bottom view for illustrating a schematic configuration of a sealing device according to a first embodiment of the present disclosure.
Figure 2:
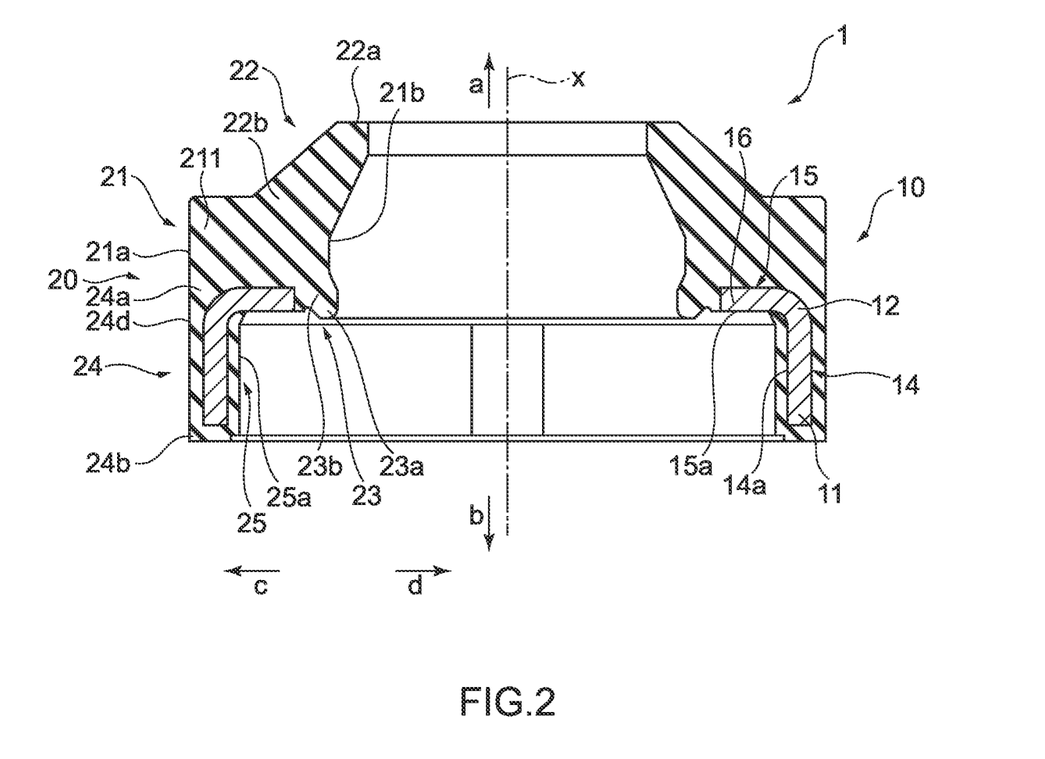
FIG. 2 A cross-sectional view of the sealing device illustrated in FIG. 1 taken from cross section A-A along an axis.

FIG. 1 is a bottom view for illustrating a schematic configuration of a sealing device 1 according to a first embodiment of the present disclosure. FIG. 2 is a cross-sectional view of the sealing device 1 taken from cross section A-A along an axis x.

Hereinafter, a direction directed by an arrow a in a direction of the axis x (one side in the direction of the axis, see FIG. 2) represents an outer side, and a direction directed by an arrow b in the direction of the axis x (another side in the direction of the axis, see FIG. 2) represents an inner side, for convenience of explanation. In a direction perpendicular to the axis x (hereinafter also referred to as a "radial direction"), a direction away from the axis x (a direction directed by an arrow c in FIG. 2) represents an outer periphery side, and a direction approaching the axis x (a direction directed by an arrow d in FIG. 2) represents an inner periphery side.

As illustrated in FIGS. 1 and 2, the sealing device 1 according to the first embodiment of the present disclosure includes a reinforcing ring 10 formed annularly around the axis x and an elastic body part 20 that is formed from an elastic body attached to the reinforcing ring 10 and that is formed annularly around the axis x. The reinforcing ring 10 includes a tubular portion 14 having a cylindrical shape around the axis x and a flange 15 projecting annularly from an outer end portion of the tubular portion 14 to an inner periphery side d. The elastic body part 20 includes a lip portion 21 that is an annular portion covering the flange 15 from an outer side a, projecting from the flange 15 toward the outer side a in the direction of the axis x, and projecting toward the inner periphery side d in the radial direction. The lip portion 21 includes a seal lip portion 22 that is an annular portion projecting toward the outer side a in the direction of the axis x and a secondary lip portion 23 that is an annular portion projecting toward an inner side b in the direction of the axis x. Hereinafter, the sealing device 1 will be described in detail.

As illustrated in FIG. 2, the reinforcing ring 10 is a tubular or substantially tubular member extending along the axis x. The reinforcing ring 10 is, for example, a cylindrical or substantially cylindrical member centered about or substantially centered about the axis x. The reinforcing ring 10, as described above, includes the tubular portion 14 and the flange 15. The tubular portion 14 has a cylindrical or substantially cylindrical surface formed around the axis x. The tubular portion 14 has a reinforcing-ring inner side end 11 that is formed on an end portion on the inner side b and a reinforcing-ring outer side end 12 that is an end portion on the outer side a. The tubular portion 14 has a tubular-portion inner peripheral surface 14a that is a surface on the inner periphery side d.

The flange 15 annularly projects toward the inner periphery side d from the reinforcing-ring outer side end 12, an end portion on the outer side a of the tubular portion 14. The flange 15 has a reinforcing-ring inner peripheral end 16 that is an end portion on the inner periphery side d. The flange 15 has a flange inner side surface 15a that is a surface on the inner side b.

The reinforcing ring 10 is a part used to reinforce the elastic body part 20. The tubular portion 14 and the flange 15 of the reinforcing ring 10 are formed, for example, by bending a metal material. The metal material used in the reinforcing ring 10 is, for example, stainless steel or SPCC (a cold rolled steel sheet). If the reinforcing ring 10 is made of a resin material, the resin material used in the reinforcing ring is, for example, nylon 66 (PA66) or a polyphenylene sulfide (PPS) resin.

The elastic body part 20 is formed so as to cover the reinforcing ring 10. The elastic body part 20, as described above, has the lip portion 21, as well as the seal lip portion 22, the secondary lip portion 23, an outer peripheral portion 24, and a base portion 25. The outer peripheral portion 24 covers a surface on an outer periphery side c of the tubular portion 14. The tubular portion 14 is formed annularly in the reinforcing ring 10. The base portion 25 covers a part at the inner periphery side d of the outer peripheral portion 24, i.e., a surface on the inner periphery side d of the tubular portion 14. A portion of the base portion 25 facing the inner periphery side d is an inner peripheral portion 25a. The inner peripheral portion 25a covers the tubular-portion inner peripheral surface 14a from the inner periphery side d.

Figure 3:
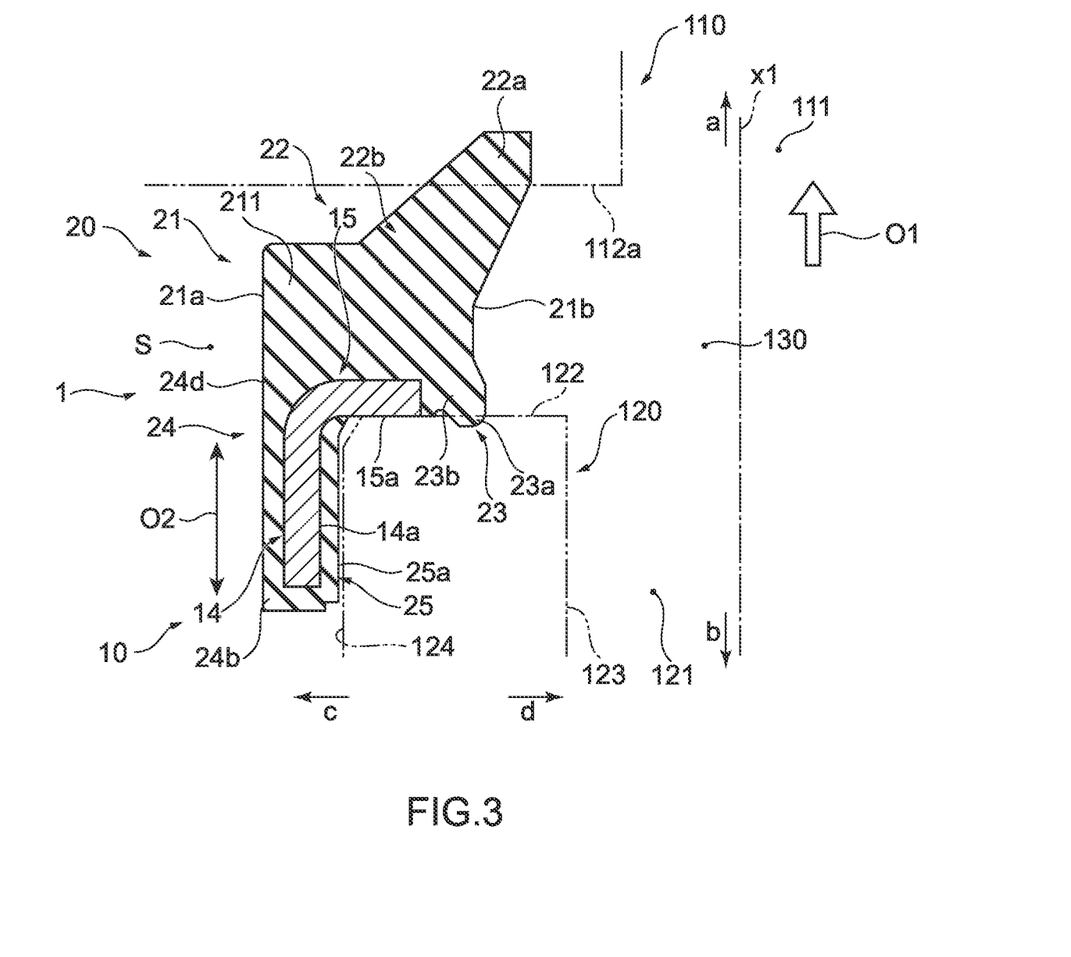
FIG. 3 A schematic view of the sealing device illustrated in FIG. 1 and an attachment space to which the sealing device is attached taken from a cross section along an axis to illustrate a difference in shape between the sealing device and the attachment space.

FIG. 3 is a schematic view of the sealing device 1 and an attachment space S to which the sealing device 1 is attached taken from a cross section along an axis x1 to illustrate a difference in shape between the sealing device 1 and the attachment space S. In FIG. 3, the sealing device 1 and the attachment space S to which the sealing device 1 is attached overlap in the cross section along the axis x1 to schematically illustrate a difference in shape and size between the sealing device 1 and the attachment space S. As illustrated in FIG. 3, regarding the sealing device 1, a length of the elastic body part 20 including the lip portion 21, the seal lip portion 22, the outer peripheral portion 24, and the base portion 25 is longer than a length of the attachment space S in a direction of the axis x1.

As illustrated in FIG. 2, the outer peripheral portion 24 is a portion covering the reinforcing ring 10 from the outer periphery side c. The outer peripheral portion 24 has an outer-peripheral outer side end 24a, an end portion on the outer side a, that is joined to the lip portion 21. The outer peripheral portion 24 is formed such that an outer-peripheral inner side end 24b, an end portion on the inner side b, covers the reinforcing-ring inner side end 11 of the tubular portion 14. The outer peripheral portion 24 has an edge (a corner) formed on the outer periphery side c in the vicinity of the outer-peripheral inner side end 24b. The outer-peripheral inner side end 24b is defined by an annular surface facing the inner side b and an outer peripheral surface portion 24d that is a tubular surface facing the outer periphery side c.

As illustrated in FIG. 2, the base portion 25 covers the tubular portion 14 of the reinforcing ring 10 from the inner periphery side d. An end portion on the outer side a of the base portion 25 is joined to the lip portion 21. The base portion 25 is formed such that the inner peripheral portion 25a on the inner periphery side d covers the tubular-portion inner peripheral surface 14a of the tubular portion 14 from the inner periphery side d. In other words, in the sealing device 1, the inner peripheral portion 25a of the base portion 25 is formed annularly around the axis x.

The lip portion 21 is disposed so as to cover the flange 15 of the reinforcing ring 10 from the outer side a. The lip portion 21 is formed annularly around the axis x. In the lip portion 21, a lip body 211, the seal lip portion 22, and the secondary lip portion 23 are disposed.

The lip body 211 is formed so as to extend from the outer peripheral portion 24 and the base portion 25 of the elastic body part 20 toward the outer side a. The lip body 211 is, for example, formed such that an outer peripheral surface portion 21a, a surface on the outer periphery side c, is flush with the outer peripheral surface portion 24d of the outer peripheral portion 24. The lip body 211 is formed such that a surface on the outer side a of the lip body is parallel to or substantially parallel to a surface on the outer side a of the flange 15. The elastic body part includes the seal lip portion 22 and the secondary lip portion 23 on the inner periphery side d of the lip body 211. An inner peripheral surface portion 21b is formed between the seal lip portion 22 and the secondary lip portion 23 on the inner periphery side d of the lip body 211. The secondary lip portion 23 is formed so as to extend from an end portion on the inner periphery side d of the lip body 211 to the inner side b in the direction of the axis.

The seal lip portion 22 projects diagonally from the end portion on the inner periphery side d of the lip body 211 toward the outer side a and the inner periphery side d. The seal lip portion 22 is, for example, a portion that increases in diameter as progress toward the inner side b (that decreases in diameter as progress toward the outer side a) in the direction of the axis x. An extent to which the seal lip portion 22 increases in diameter is not particularly limited. The seal lip portion 22 is a conical cylindrical or substantially conical cylindrical portion centered about or substantially centered about the axis x. The seal lip portion 22 projects to the outer side a with respect to the reinforcing-ring outer side end 12 and the flange 15. A seal-lip distal end 22a that is an end portion on the outer side a of the seal lip portion 22 is positioned on the outer side a with respect to the reinforcing-ring outer side end 12 and the flange 15 in the direction of the axis x. The elastic body part 20 of the sealing device 1 may be formed so as to increase in diameter as progress from the lip body 211 toward the seal-lip distal end 22a. An extent to which the elastic body part 20 of the sealing device 1 increases or decreases in diameter as progress from the lip body 211 toward the seal-lip distal end 22a may be constant or may vary place by place. The seal-lip distal end 22a is thinner than a seal-lip root 22b that is a portion joined to the lip body 211. The seal lip portion 22 may increase in thickness as progress from the seal-lip root 22b toward the seal-lip distal end 22a, for example.

The seal lip portion 22 projects in a direction of the outer side a that is a direction, indicated by an arrow O1 in FIG. 3, in which the sealing device comes off in a sealing structure where the sealing device 1 is attached. The seal-lip distal end 22a of the seal lip portion 22 projects to the outer side a with respect to the reinforcing ring 10 and the surface on the outer side a of the lip body 211 in a direction of an axis x1. The seal lip portion 22 projects to the inner periphery side d with respect to the reinforcing ring 10 and the lip body 211 in the radial direction. In other words, the seal lip portion 22 has a length and an outer peripheral surface so as to be in contact with a housing surface 112a, a sealing surface on the outer side a, with a predetermined interference in a usage state described later. Note that the length of the seal lip portion 22 is a width in a direction of extension (a direction of projection, the direction of the outer side a in FIG. 3) of the seal lip portion 22.

As illustrated in FIG. 2, the secondary lip portion 23, for example, projects diagonally from a place on the inner side b of the end portion on the inner periphery side d of the lip body 211 toward the inner side b and the inner periphery side d. Specifically, the secondary lip portion 23 is a portion that decreases in diameter as progress toward the inner side b in the direction of the axis x. The secondary lip portion 23 is a conical cylindrical or substantially conical cylindrical portion centered about or substantially centered about the axis x. The secondary lip portion 23 projects to the inner side b with respect to the reinforcing-ring inner peripheral end 16 on the inner periphery side d of the flange 15. A secondary-lip distal end 23a is an end portion on the inner side b of the secondary lip portion 23. The secondary-lip distal end 23a is positioned on the inner side b with respect to the lip portion 21 and the flange 15 in the direction of the axis x. The secondary-lip distal end 23a is thinner than a secondary-lip root 23b that is a portion joined to the base portion 25. The secondary lip portion 23, for example, extends from the lip body 211 toward the inner side b and the inner periphery side d. The secondary lip portion 23 decreases in thickness as progress from the secondary-lip root 23b toward the secondary-lip distal end 23a. The secondary lip portion 23 has a length so as to be in contact with a pipe end portion 122 on the outer side a of a pipe 120, a sealing surface on the inner side b, with a predetermined interference in the usage state described later. The secondary lip portion 23 is short in an amount of projection (a length of a projecting part) in the direction of the axis x as compared to the seal lip portion 22. The secondary lip portion 23 is also short in a dimension in the radial direction as compared to the seal lip portion 22. In other words, a total volume of the secondary lip portion 23 formed into a conical cylinder or a substantially conical cylinder is small as compared to that of the seal lip portion 22.

As illustrated in FIG. 2, the elastic body part 20 may not cover the flange inner side surface 15a on the inner side b of the flange 15. The elastic body part 20 may be flush with the flange inner side surface 15a in the direction of the axis x. The elastic body part 20 may not be flush with the flange inner side surface 15a in the direction of the axis x. The elastic body part 20 may cover the flange inner side surface 15a. In this case, the elastic body part 20 is formed such that the secondary-lip distal end 23a is positioned on the inner side b with respect to a part of the elastic body part 20 covering the flange inner side surface 15a in the direction of the axis x.

Examples of the elastic body of the elastic body part 20 include various rubber materials. The various rubber materials are, for example, synthetic rubber such as nitrile rubber (NBR), hydrogenated nitrile rubber (H-NBR), acrylic rubber (ACM), and fluororubber (FKM).

The reinforcing ring 10 is manufactured by press working or forging, for example. The elastic body part 20 is molded with a mold by cross-linking (vulcanization). During the cross-linking, the reinforcing ring 10 is placed in the mold. The elastic body part 20 is bonded to the reinforcing ring 10 by cross-linking bonding, and the elastic body part 20 is integrally molded with the reinforcing ring 10.

Thereafter, the sealing device 1 in the usage state described above will be described.

Figure 4:
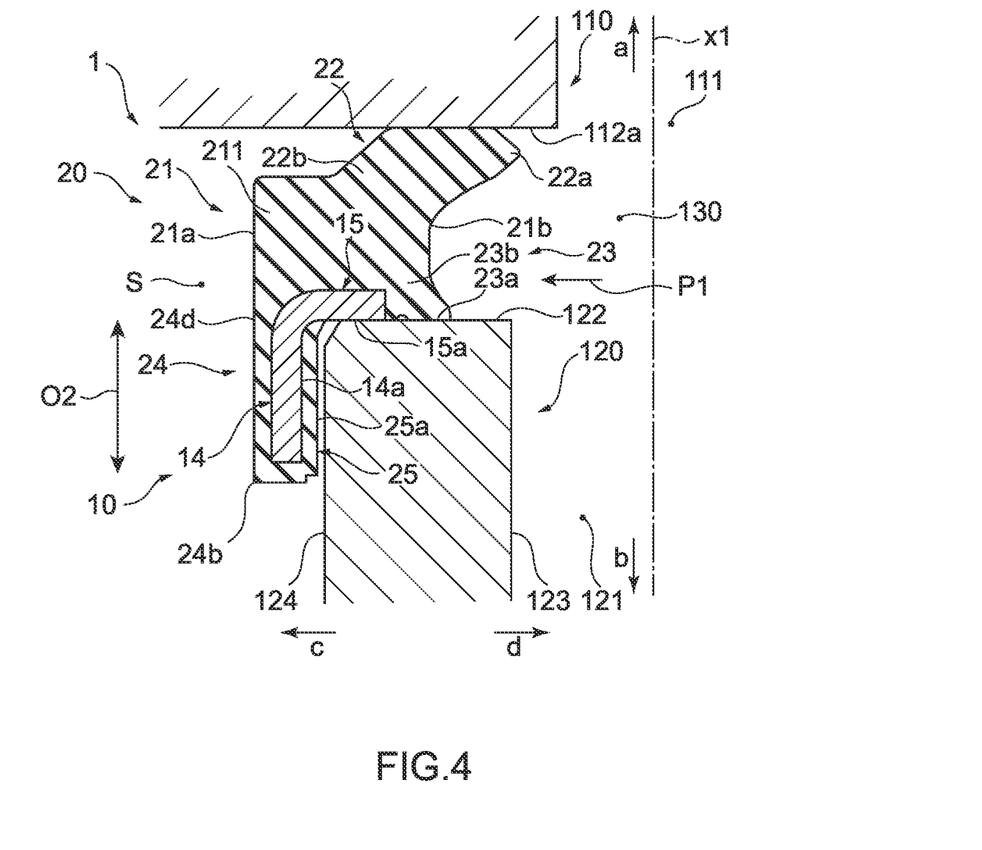
FIG. 4 A cross-sectional view illustrating the sealing device illustrated in FIG. 1 in a usage state.

FIG. 4 is a cross-sectional view illustrating the sealing device 1 in a usage state. As illustrated in FIG. 4, the sealing device 1 gets into the usage state when the sealing device is attached to an attachment space S, an annular space. The attachment space S is an annular or substantially annular space that is formed around an axis x1 by a plurality of members. The attachment space S is, for example, formed by a housing 110 and the pipe 120, a cylindrical member. The housing 110 has a through-hole 111, and the pipe 120 has a through-hole 121 communicating with the through-hole 111 of the housing 110. The pipe 120 has the pipe end portion 122, a pipe inner peripheral surface 123, and a pipe surface 124. The pipe surface 124 is annular around the axis x1 and is exposed to the outer periphery side c. The pipe end portion 122 is annular in the radial direction. The pipe inner peripheral surface 123 faces the inner periphery side d and is formed around the axis x1. In the attachment space S, a space is formed between the housing 110 and the pipe 120 to only allow the sealing device 1 to be interposed between the members.

The housing 110 is disposed such that the housing surface 112a of the housing faces the pipe end portion 122 of the pipe 120. The housing 110 is configured such that the through-hole 111 of the housing is coaxial or substantially coaxial with respect to the through-hole 121 of the pipe 120. Thus, the through-hole 111 and the through-hole 121 communicate to form a single through-tube 130. The housing surface 112a is an annular flat surface facing the pipe end portion 122 of the pipe 120 in the direction of the axis x1. In the housing 110, the housing surface 112a is an outer-side sealing surface. The attachment space S is an annular space defined by the above-described housing surface 112a and the pipe end portion 122 and the pipe inner peripheral surface 123 of the pipe 120. The sealing device 1 in the attachment space S seals the through-tube 130 formed by a through-hole 111 and the through-hole 121. In the attachment space S, the inner peripheral surface portion 21b of the lip portion 21 of the sealing device 1 faces the through-tube 130. In the through-tube 130, pressure (internal pressure P1) is exerted from the inner periphery side d toward the outer periphery side c.

In the usage state, the sealing device 1 is attached to the pipe end portion 122 of the pipe 120 coaxially or substantially coaxially with respect to the through-tube 130. In other words, in the usage state, the axis x of the sealing device 1 illustrated in FIG. 2 and the axis x1 coincide with or slightly diverge from each other.

As illustrated in FIGS. 3 and 4, the inner peripheral portion 25a of the base portion 25 centered about and formed annularly around the axis x1 at the inner periphery side d of the tubular-portion inner peripheral surface 14a is in contact with the pipe surface 124, an outer periphery side surface of the pipe 120, across a range indicated by an arrow O2 in the direction of the axis x1. In other words, the tubular-portion inner peripheral surface 14a formed in the sealing device 1 allows the sealing device to be put into contact with the pipe surface 124, an outer peripheral portion of the pipe 120, and movement of the sealing device in the radial direction is restricted by an inside diameter of the tubular-portion inner peripheral surface 14a. This configuration enables the sealing device to be positioned in the radial direction.

The flange inner side surface 15a is in contact with the pipe end portion 122 of the pipe 120. The secondary lip portion 23 is pressed by the pipe end portion 122 of the pipe 120 and is in contact with the pipe end portion 122 with a predetermined interference or squeeze. In other words, in the sealing device 1, the flange inner side surface 15a of the reinforcing ring 10 and the secondary lip portion 23 of the elastic body part 20 are disposed. The members formed in this way allows the sealing device 1 to be put into contact with the pipe end portion 122, a surface on the outer side a of the pipe 120, and movement of the sealing device in the direction of the axis x is restricted. This configuration enables the sealing device to be positioned in the direction of the axis x1.

Figure 5:
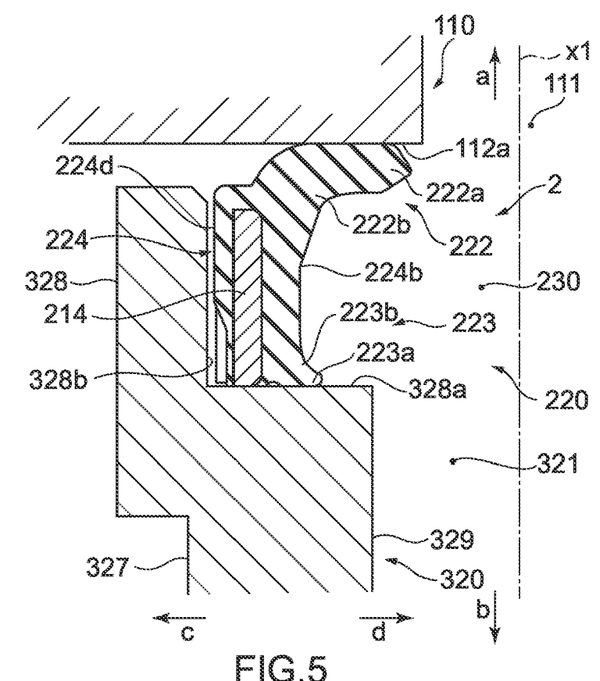
FIG. 5 A cross-sectional view illustrating a sealing device according to a reference example in a usage state taken along an axis.
Figure 6:
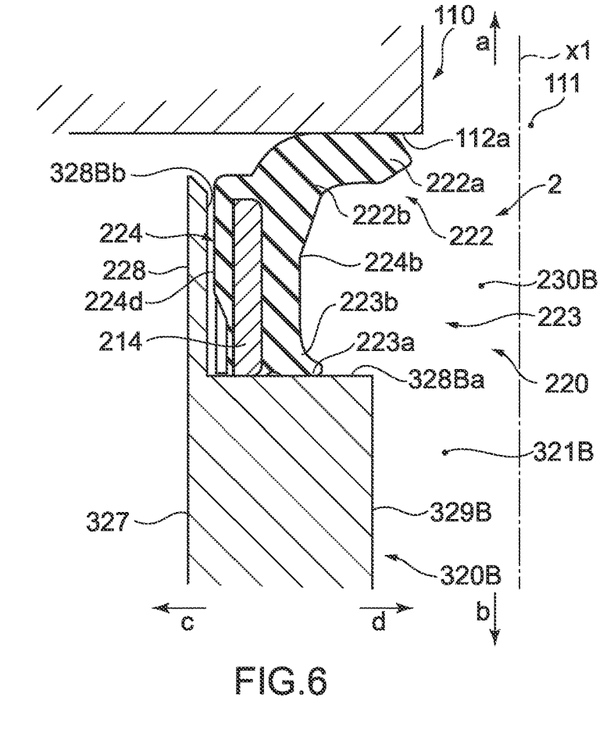
FIG. 6 A cross-sectional view illustrating the sealing device according to the reference example illustrated in FIG. 5 in another usage state taken along an axis.

FIG. 5 is a cross-sectional view of a sealing device 2 according to a reference example taken along an axis x. FIG. 6 is a cross-sectional view of the sealing device 2 according to the reference example taken along the axis x.

As illustrated in FIGS. 5 and 6, in the sealing device 2 according to the reference example, a reinforcing ring 214 does not include a tubular portion 14 and a flange 15 unlike the sealing device 1. In the sealing device 2 according to the reference example, an elastic body part 220 does not include a lip portion 21 projecting from a reinforcing ring 10 toward the outer side a in the direction of the axis x unlike the sealing device 1.

In the sealing device 2, the reinforcing ring 214 does not include the tubular portion 14 and the flange 15 unlike the sealing device 1. This necessitates forming a groove 228 with an increased diameter in the inner periphery side d of a pipe 320 to which the sealing device 2 is attached to hold the sealing device 2 from the outer periphery side c.

As illustrated in FIG. 6, a sealing device 2 is configured in a similar way to the sealing device 2 as illustrated in FIG. 5. Thus, in some cases, an inner peripheral wall part 328b is inevitably thin in thickness depending on a dimension and a thickness of the pipe 320 in the radial direction, and this makes it difficult to provide a groove 328.

Meanwhile, as described above, the sealing device 1 is designed to be positioned in the radial direction by the tubular-portion inner peripheral surface 14a of the reinforcing ring 10 and the inner peripheral portion 25a of the base portion 25 of the elastic body part 20 and is designed to be positioned in the direction of the axis x by the flange inner side surface 15a and the secondary lip portion 23. As a result, the sealing device 1 can be, for example, attached to even a pipe 120 that is thin in thickness and makes it difficult to form a groove without formation of a groove in the inner periphery side d of the pipe.

Thus, the sealing device 1 can possess improved attachability to a component to which the sealing device is applied.

In the sealing device 1, the seal lip portion 22 and the secondary lip portion 23 of the lip portion 21 are formed from the elastic body part 20, which is a single elastic body. Here, the secondary lip portion 23 projecting to the inner side b in the direction of the axis x is smaller than the seal lip portion 22 projecting to the outer side a in the direction of the axis x. As a result, in the lip portion 21, the secondary lip portion 23 is low in rigidity and can readily deform compared to the seal lip portion 22. In other words, the secondary lip portion 23 deforms positively when being compressed by an external force or when receiving the internal pressure P1 from the through-tube 130 toward the outer periphery side c. In this way, the secondary lip portion 23 deforms positively and the flange inner side surface 15a is thereby put into contact with the pipe end portion 122 of the pipe 120. This enables the sealing device 1 to be positioned in the direction of the axis x.

The lip portion 21 configured as described above enables the sealing device 1 to inhibit posture deformation caused by the internal pressure P1 and thus provide stable sealing performance. The lip portion 21 configured as described above enables the sealing device 1 to offset a difference (a variation) in a size of the attachment space S by the seal lip portion 22 having a large size. Further, the lip portion 21 configured as described above enables the sealing device 1 to inhibit the tubular-portion inner peripheral surface 14a and the inner peripheral portion 25a from moving to the outer side a in the direction of the axis x and being detached from the pipe surface 124 of the pipe 120. This prevents the sealing device 1 from coming off.

As described above, the sealing device 1 according to the first embodiment of the present disclosure can possess improved attachability to a component such as the pipe 120 to which the sealing device is applied.

Figure 7:
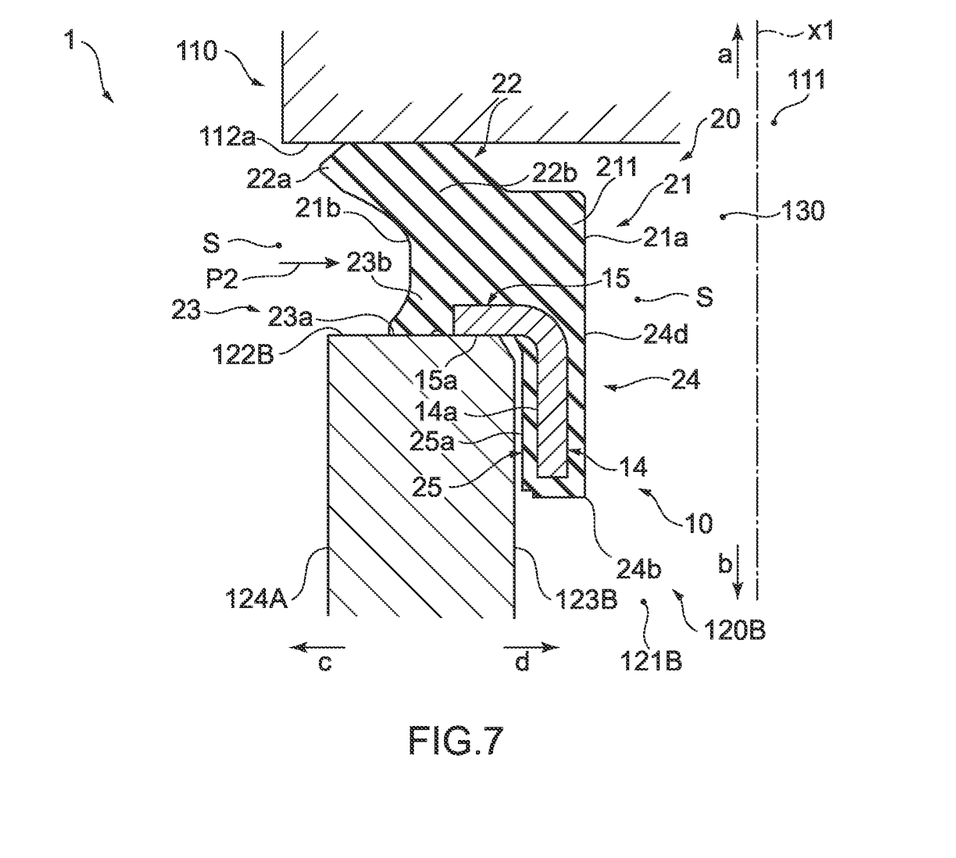
FIG. 7 A cross-sectional view illustrating the sealing device illustrated in FIG. 1 in a modification example of a usage state taken along an axis.

FIG. 7 is a cross-sectional view illustrating the sealing device 1 in a modification example of a usage state taken along an axis. Unlike the sealing device in an example of the usage state illustrated in FIG. 3, the sealing device 1, as illustrated in FIG. 7, is attached such that the inner peripheral portion 25a of the base portion 25 of the elastic body part 20 is in contact with a pipe inner peripheral surface 123B of a pipe 120B and the inner peripheral surface portion 21b of the lip portion 21 faces the outer periphery side c of the attachment space S. Being attached in this way, the sealing device 1 can also be applied to a component to seal the component against pressure (external pressure P2) from the outer periphery side c.

Second Embodiment

Thereafter, a sealing device 1C according to a second embodiment of the present disclosure will be described. Hereinafter, components of the sealing device 1C that are identical or similar in function to those of the sealing device 1 according to the first embodiment described above are assigned the same reference signs, and descriptions thereof are omitted. Only components that differ between the sealing devices will be described.

Figure 8:
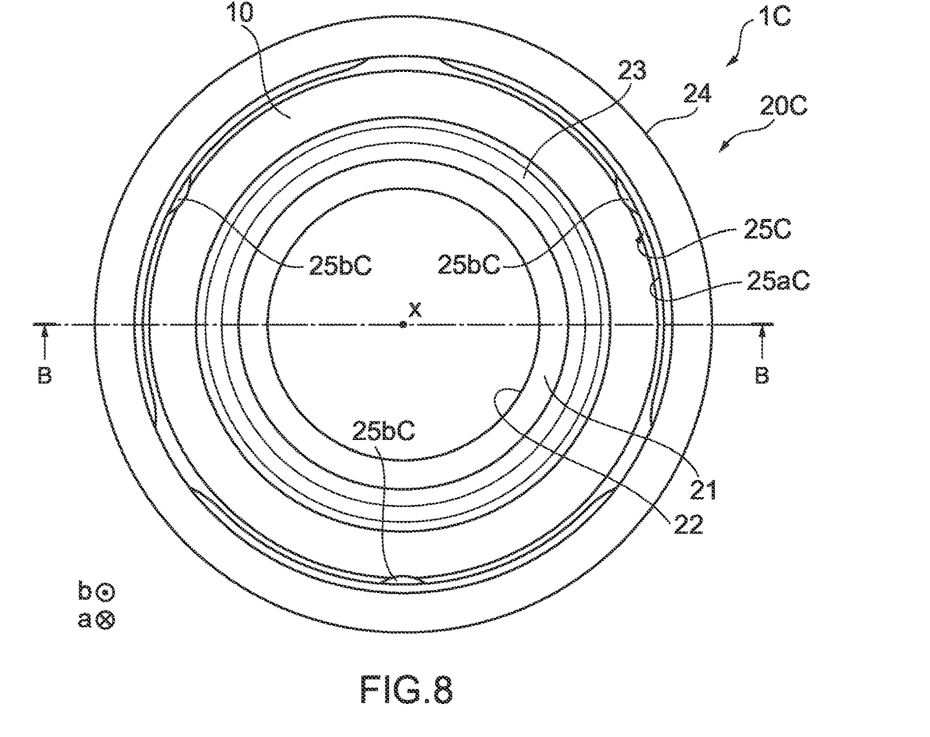
FIG. 8 A bottom view for illustrating a schematic configuration of a sealing device according to a second embodiment of the present disclosure.
Figure 9:
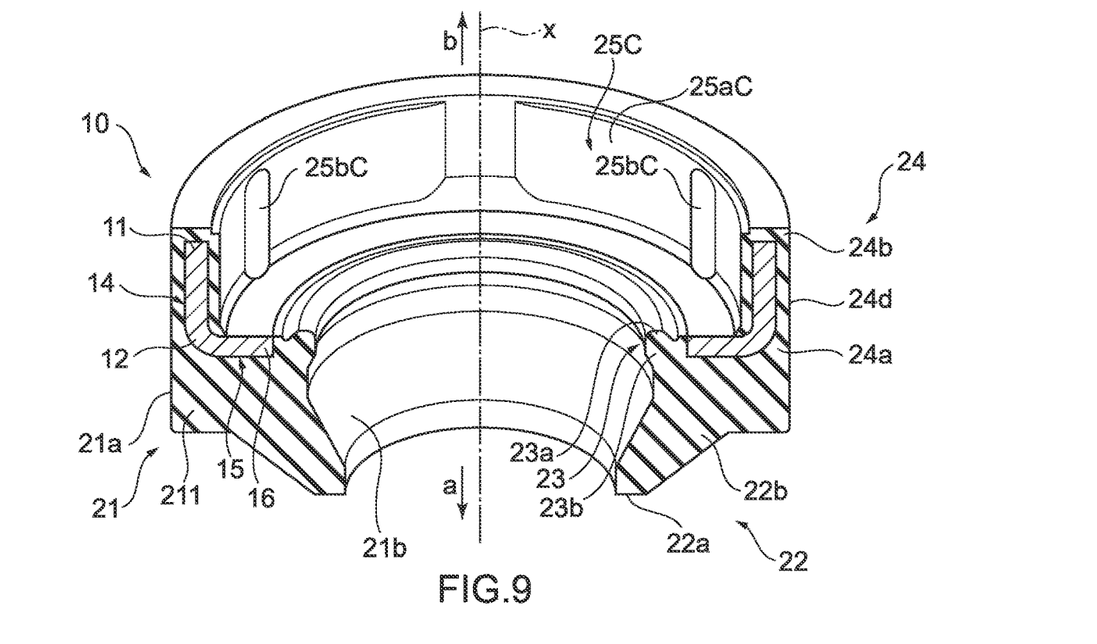
FIG. 9 A perspective cross-sectional view of the sealing device illustrated in FIG. 8 taken from cross section B-B along an axis.

FIG. 8 is a bottom view for illustrating a schematic configuration of the sealing device 1C according to the second embodiment of the present disclosure. FIG. 9 is a perspective cross-sectional view of the sealing device 1C taken from cross section B-B along an axis x.

As illustrated in FIGS. 8 and 9, in the sealing device 1C, protrusions 25bC each projecting toward the inner periphery side d may be formed on an inner peripheral portion 25aC of a base portion 25C. The inner peripheral portion 25aC faces the inner periphery side d and covers a tubular-portion inner peripheral surface 14a from the inner periphery side d. When the sealing device 1C is in a usage state, the protrusions 25bC are in contact with a pipe surface of a pipe. The protrusions 25bC position the sealing device relative to the pipe surface in the radial direction. With the protrusions 25bC formed on the inner peripheral portion 25aC, the sealing device 1C is kept from coming off in the usage state. The other components of the sealing device 1C are similar to those of the sealing device 1 described above.

In a similar way to the sealing device 1 described above, the sealing device 1C according to the second embodiment can possess improved attachability to a component to which the sealing device is applied.

Although the embodiments of the present disclosure have been described above, the present disclosure is not limited to the above-described embodiments of the present disclosure, and includes any modes falling within the scope of the concept and claims of the present disclosure. Respective configurations may be appropriately selectively combined to solve at least part of the above-described problems and achieve at least part of the above-described effects. For example, in the above-described embodiments, the shape, material, arrangement, size and the like of each component can be appropriately changed according to a specific use mode of the present disclosure.

The invention claimed is:

1. A sealing device for sealing an annular space formed by a plurality of members, the sealing device comprising:
   a reinforcing ring formed annularly around an axis; and
   an elastic body part that is formed from an elastic body attached to the reinforcing ring and that is formed annularly around the axis, the reinforcing ring including:
      a tubular portion having a cylindrical shape around the axis; and
      a flange projecting annularly from an outer end portion of the tubular portion to an inner periphery side,
   wherein the elastic body part includes an elastic tubular portion that covers the tubular portion of the reinforcing ring and a lip portion that is an annular portion covering the flange from an outer side, the lip portion projecting from the flange toward the outer side in a direction of the axis and projecting toward the inner periphery side in a radial direction, the lip portion including:
      a seal lip portion that is an annular portion projecting toward the outer side in the direction of the axis; and
      a secondary lip portion that is an annular portion projecting toward an inner side in the direction of the axis,
      both the seal lip portion and the secondary lip portion are positioned radially inward of the flange,
      wherein the seal lip portion and the elastic tubular portion protrude axially in opposite directions from the flange; and
      wherein, in the direction of the axis, the secondary lip portion is closer to the flange than the seal lip portion.

2. The sealing device according to claim 1, wherein the tubular portion has a tubular-portion inner peripheral surface on the inner periphery side,
- wherein the flange has a flange inner side surface on the inner side,
- wherein the tubular-portion inner peripheral surface enables the sealing device to be positioned relative to the plurality of members in the radial direction, and
- wherein the flange inner side surface enables the sealing device to be positioned relative to the plurality of members in the direction of the axis.

3. The sealing device according to claim 2, wherein an inner peripheral portion of the elastic tubular portion covers the tubular-portion inner peripheral surface from the inner periphery side.

4. The sealing device according to claim 3, wherein the plurality of members include at least a cylindrical member,
- wherein the tubular-portion inner peripheral surface enables the sealing device to be positioned in the radial direction by allowing the sealing device to be in contact with an outer peripheral portion included in the cylindrical member, and
- wherein the flange inner side surface enables the sealing device to be positioned in the direction of the axis by allowing the sealing device to be in contact with an outer side surface formed on the cylindrical member.

5. The sealing device according to claim 1, wherein the seal lip portion projects to the outer side with respect to the flange in the direction of the axis, and
- wherein the secondary lip portion projects to the inner side with respect to the flange in the direction of the axis.

6. The sealing device according to claim 1, wherein a length of the seal lip portion in the direction of the axis is greater than a length of the secondary lip portion in the direction of the axis.

7. The sealing device according to claim 1, wherein, with respect to the inner side in the direction of the axis, a distal end of the elastic tubular portion is positioned rearward of both the seal lip portion and the secondary lip portion.

* * * * *